Jan. 1, 1924
G. A. STEINMAN
KNIFE
Filed Dec. 22, 1921
1,479,015
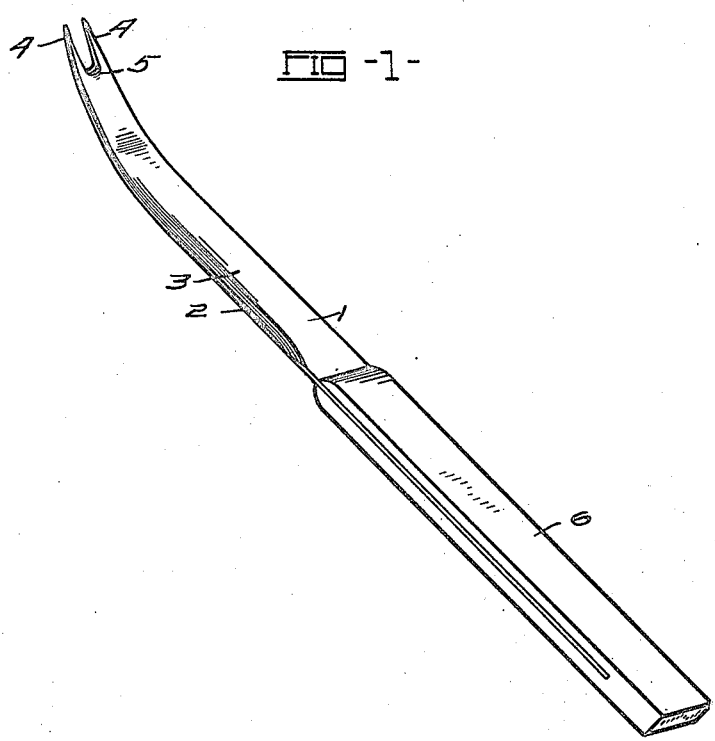
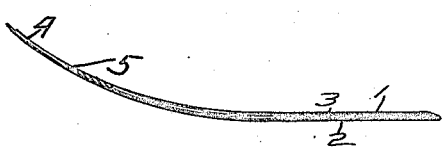
INVENTOR
Gertrude A. Steinman
by
Owen, Owen & Crampton Patented Jan. 1, 1924.

1,479,015

UNITED STATES PATENT OFFICE.

GERTRUDE A. STEINMAN, OF TOLEDO, OHIO.

KNIFE.

Application filed December 22, 1921. Serial No. 524,050.

*To all whom it may concern:*

Be it known that I, GERTRUDE A. STEINMAN, a citizen of the United States, and a resident of Toledo, in the county of Lucas and State of Ohio, have made an Invention Appertaining to a Knife; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide particularly a grape fruit knife for trimming grape fruits and prepare the fruit for table service. The invention may be modified in details without departing from the scope of the claim. To illustrate a practical application of the invention I have selected a knife containing the invention and shall describe it hereinafter. The knife selected is illustrated in the accompanying drawings.

Figure 1 illustrates a perspective view of the knife. Fig. 2 illustrates an inner view of a part of the blade of the knife showing a part thereof in section.

The end of the blade 1 is curved laterally so that it will conform substantially to the curvature of the ordinary grape fruit extending from the center of the skin or peel of one-half of the grape fruit to the edge of the half, or speaking spherically, to the edge of the hemisphere formed by cutting the grape fruit across its polar or central axis. One edge 2 of the knife is sharpened by a convex curvature formed along the edge and on one side 3 thereof producing substantially a chisel edge, the sloping or ground edge being located on the concave side of the knife so that in the operation of the cutting of the sections of the grape fruit, the flat side of the knife will be on the outer or skin side of the grape fruit and the sloping edge forming surface and the concaved side of the knife will be on the core side of the grape fruit. The knife moreover, by reason of the curvature along its lower end portion forms a convenient shape for cutting the core near the lower end thereof since the knife may be held almost vertically while the lower end of the blade will extend diagonally across the lower end of the core.

The end of the knife is provided with two prongs 4 that are sharpened in the crotch 5 thereof whereby the seeds of the grape fruit may be easily engaged and the fibrous stems of the seeds may be easily severed. When the fibrous partitions are cut the forked end is placed so as to spread or substantially surround the lower end of the core, thus leaving the lower end of the core intact. This holds the pulp although the fibrous partitions are cut in proximity to the skin. The seeds may then be removed by the use of the forked end or if desired the partitions may be cut in the vicinity of the seeds in order to remove the bulk of the seeds. Substantially the core may be cut at this point by pressure of the forked end against the core.

Any suitable handle, such as the handle 6, may be secured in any desired manner to the blade.

I claim:—

In a fruit knife, a blade, the outer end portion of the blade being curved cylindrically away from the bottom portion of the blade, the cutting edge of the blade being formed by a sloping surface formed on the concave side of the blade towards the edge of the blade, prongs formed on the end of the blade and having a U-shaped crotch between the prongs, the crotch having a cutting edge.

In testimony whereof I have hereunto signed my name to this specification.

GERTRUDE A. STEINMAN.